United States Patent
Crick

Patent Number: 5,891,255
Date of Patent: Apr. 6, 1999

[54] SWARF REMOVAL

[75] Inventor: Jeffrey Crick, Tamworth, United Kingdom

[73] Assignee: Unova U.K. Limited, Aylesbury, United Kingdom

[21] Appl. No.: 875,474
[22] PCT Filed: Feb. 8, 1996
[86] PCT No.: PCT/GB96/00291
§ 371 Date: Jul. 9, 1997
§ 102(e) Date: Jul. 9, 1997
[87] PCT Pub. No.: WO96/24462
PCT Pub. Date: Aug. 15, 1996

[30] Foreign Application Priority Data

Feb. 10, 1995 [GB] United Kingdom .................. 9502584

[51] Int. Cl.⁶ .............................. B08B 1/02; B08B 3/12; B08B 7/02
[52] U.S. Cl. .................. 134/1; 134/23; 134/32; 134/33; 15/94
[58] Field of Search ............................ 134/1, 23, 32, 134/33; 15/94

[56] References Cited

U.S. PATENT DOCUMENTS 3,989,537  11/1976  Sickmeier ................................ 134/1
5,054,155  10/1991  McKibben et al. ...................... 15/304

Primary Examiner—Zeinab El-Arini
Attorney, Agent, or Firm—Lee, Mann, Smith, McWilliams, Sweeney & Ohlson

[57] ABSTRACT

Methods and apparatus for removing swarf from machined components are described, in which a component is mounted on support means and the latter is vibrated in a manner to cause the component to be accelerated alternately in one direction and then the other, for a period of time. The acceleration is such as to cause the component to momentarily lift off the support means during at least part of each of the vibrations so as to bounce repetitively on the support means. The latter includes fingers adapted to engage non-critical regions of the components to reduce damage to machined surfaces or distortion of the machined component during vibration. A fluid flushing may precede and/or follow the vibration step. Apparatus for performing the method comprises a table with vibratory drive means fingers upstanding from the table to engage the underside (or apertures in the underside of) a machined component, transfer means for moving a machined component onto the fingers and for moving the component from the fingers after the vibration step, and control means for controlling the operation of the vibratory drive. The apparatus may be in addition to, or form part of, a process line along which machined components progress.

23 Claims, 4 Drawing Sheets

SWARF REMOVAL

This is national stage application of PCT/GB96/00291 filed Feb. 8, 1996.

FIELD OF INVENTION

This invention concerns methods and apparatus for removing swarf from machined products such as cylinder heads and engine blocks.

BACKGROUND TO THE INVENTION

The removal of swarf from machined products is very important since by its nature the material can cause very rapid wear and abrasion or can block coolant and lubricant passageways in an engine or other piece of equipment to which the machined product is fitted.

Conventionally swarf is removed by wash systems in which liquid is injected into and around the machined component so as to dislodge and flush therefrom any swarf and products of the machining process.

U.S. Pat. No. 5,054,155 discloses a wheel around which castings to be shaken of debris are clamped. At spaced angular positions round the rotating wheel vibrating devices 32 include pads pressed against the clamped castings to vibrate them. The castings are not mounted on a support which "generates" the vibration.

U.S. Pat. No. 3,989,537 describes an arrangement in which an engine block to be shaken of swarf is mounted on a support having resilient pads which locate the block in position. The support is both rotated and shaken during rotation.

In practice, unfortunately, minute traces of swarf have been found to remain in the passageways of a machined casting and it is an object of the present invention to provide an improved method and apparatus for supporting and vibrating machined castings such as cylinder heads and engine blocks, for removing swarf therefrom.

SUMMARY OF THE INVENTION

According to one aspect of the present invention a method of removing swarf from a machined component comprises the steps of restably supporting the component on fingers forming part of a support means, vibrating at least the fingers of the latter in a manner to cause the component to be accelerated alternately at least partly in an upward direction and then at least partly downwardly for a given period of time, and thereafter removing the component from the support means to permit another component to take its place.

The acceleration imparted to the component may be such as to cause the component to momentarily lift off the fingers during at least part of each of the vibrations during the vibration period, so that the component is caused to bounce repetitively on the fingers.

The vibrations may be in a generally vertical sense, or in a generally rotational sense so that the component describes a circular of elliptical path.

The frequency of vibration may be varied during each period of vibration, (vibration step) so as to subject each component to a number of selected different frequencies or to a range of frequencies during the vibration step.

According to another aspect of the invention, each vibration step may comprise two separate vibration modes with a different vibration amplitude, or frequency, or both, during each mode.

The component may include parts which protrude from the surface on which it would be supported for the vibration step, and according to a preferred feature of the invention, the fingers are adapted to engage non-critical regions of the component, so as to reduce the risk of damage to machined surfaces or distortion of the machined component during the vibration.

Advantageously, the fingers may protrude up into cavities within the component so that there is little risk of lateral displacement of the component relative to the fingers as it is vibrated.

The fingers may be movable relative to a support surface to engage the component and the method may include the step of positioning the component on the support surface and elevating the component therefrom by raising the fingers relative thereto. Thereafter in accordance with the invention, the fingers are lowered after the vibration step so that the component once again rests on the support surface from which it is removed, to permit a new component to take its place.

Where machining of the component has been performed from above, it may be preferable for reliable swarf removal, for the component to be inverted prior to being vibrated.

To further assist in swarf removal, the component may be vibrated successively, first upside down (ie inverted), and then the correct way up.

In an extension of the method of the invention, where the component is to be machined at two or more separate positions along a process line, the vibration step provided by the invention may be performed after one, or some, or all, of the separate machining steps, with or without inversion before the or each vibration step.

Each vibration step in the extension of the method may comprise two or more separate modes of vibration.

Flushing with a fluid may precede or follow the or each vibration step, or may both precede and follow the or each vibration step.

Vibratory apparatus for performing the method comprises a table with vibratory drive means associated therewith (typically on the underside thereof) for imparting vibration thereto, fingers upstanding from the table restably to support the component at the underside thereof (or apertures in the underside), means for moving a machined component onto the fingers to support the latter thereon whilst the table is to be vibrated at least partly up and down, transfer means for moving the component from the fingers after the vibration step, and control means for controlling the operation of the vibratory drive.

The control means may include sensors for detecting when a component is positioned on the fingers, and timing means for determining the duration of the vibration step.

The fingers may be movable relative to a platform on which the component is initially placed, to engage the underside of, (or apertures in the underside of) the component, and lift the latter thereon clear of the platform (and any other supporting structure) during the vibration step.

Preferably the positions of the fingers on the table are adjustable so that their configuration is such that they engage selected non-critical regions of the component to reduce the risk of damage thereto during vibration.

The fingers may be adjustable both laterally relative to one another (and to the table) and vertically (relative to one another) to allow for different depths of penetration into the component.

The vibratory drive may be an electro-magnetic drive which may be a linear or rotational vibration drive, and the table may be mounted for vibration relative to a fixed support.

The vibratory apparatus may be an addition to, or form part of a process line along which machined components progress.

The vibratory apparatus may be adapted to lift the components sequentially so each in turn is clear of the line, for vibration for the given period of time, and then replaced on the line for onward transmission therealong.

The vibrating apparatus may form part of the line (ie be in line with other processing stages along the line).

Alternatively the vibratory apparatus may be located to the side of the process line and components are moved off the line laterally onto the vibratory apparatus. Afterwards they may be moved back onto the line, or moved onto another line.

The vibratory apparatus may be incorporated into and form part of component machining or processing apparatus which itself forms part of the process line along which the components traverse. Where only one vibration stage is required, this is most appropriately incorporated into the last such apparatus along the line.

Means for rotating the component into an inverted state may be incorporated into the process line before the or each vibratory apparatus according to the invention, or may form part of the said apparatus, so that it is inverted as it is transferred from the line to the vibratory apparatus.

A preferred vibrating table is that produced by Applied Vibration Ltd under reference VT 600/300-3/25 using an electric rotary vibrator as supplied by Italvibran g. Silingardi under reference MVSI 3/200-S90.

Where such a vibratory table and drive is employed, the efficiency of the swarf removal process may be altered by adjustment of the counterweights in the drive to alter the amplitude of the vibration, and therefore the accelerations imparted to a component as it is vibrated.

Using the above vibrating table and drive, good results have been obtained with the apparatus set to vibrate a machined casting at frequencies in the range 40–80 Hz, with an amplitude of vibration of the casting support in the range 0.4–1.28 mm achieving accelerations in the range 3–5 g to 6.4 g for periods of time in the range 5–20 seconds.

A preferred setting was found to be 50 Hz for 5 seconds with an amplitude of 1.15 mm achieving accelerations up to 5.78 g.

Another preferred setting was found to be 50 Hz for 5 seconds with an amplitude of 1.28 mm achieving accelerations up to 6.4 g.

Using the preferred settings, vibration in accordance with the invention allowed adequate removal of short chipped swarf from the majority of the cavities within an inverted machined casting forming the cylinder head of an internal combustion engine.

Wash means may be provided upstream, or downstream, or both upstream and downstream of the vibratory apparatus.

By combining vibration with a fluid wash before and/or after vibration, swarf removal can be further improved. A preferred fluid is liquid coolant such as is employed to cool machining tools and workpieces.

In a preferred set up the component is subjected to high pressure wash jets prior to vibration and to a jet wash after vibration. Preferably a fan jet is employed.

In a first arrangement both the wash jets before and after vibration are directed in a generally downward manner onto the component.

In a second arrangement wash jets before and after the vibration stage are directed in a generally upward manner towards the underside of the component.

In a third arrangement, a succession of wash jets are provided before the vibration stage, alternately directed upwardly and downwardly towards the component.

In a fourth arrangement, which may be additional to any of the foregoing a succession of wash jets are provided after the vibrating stage, alternately directed upwardly and downwardly towards the component.

Where the component includes crevices, cavities and/or machined openings and bores, which by virtue of shape or internal wall structure (such as screw thread profiling and the like) are particularly prone to trapping swarf, some or all of the wash jets advantageously may be directed into any such openings in the component.

The invention is particularly applicable to the removal of swarf from the tappet chest area and from drilled and tapped bolt holes of a machined engine cylinder head, and the invention includes the method of supporting such a head typically in an inverted condition on support means, and vibrating the latter in accordance with the invention, to remove swarf from at least those regions thereof.

In addition to or instead of the use of liquid for the washing step(s), gas (such as compressed air) may be jetted towards the component.

The invention will now be described by way of example with reference to the accompanying drawings, in which:

FIG. 1 is a diagrammatic plan view of part of a process line for machining cylinder head castings for internal combustion engines, including swarf removal apparatus according to the invention.

FIG. 2 is an elevation of apparatus adapted to form part of or be associated with a component machining line, for vibrating each component in turn as it passes along the line, to remove swarf therefrom, FIG. 3 is a side view of the apparatus of FIG. 2 with a machined component in place on the vibratory support, FIG. 4 is a cross-section on AA in FIG. 3, and FIG. 5 is an outline drawing showing in elevation the mounting of a vibratory drive and support table.

DETAILED DESCRIPTION OF THE DRAWINGS

Figure 1:
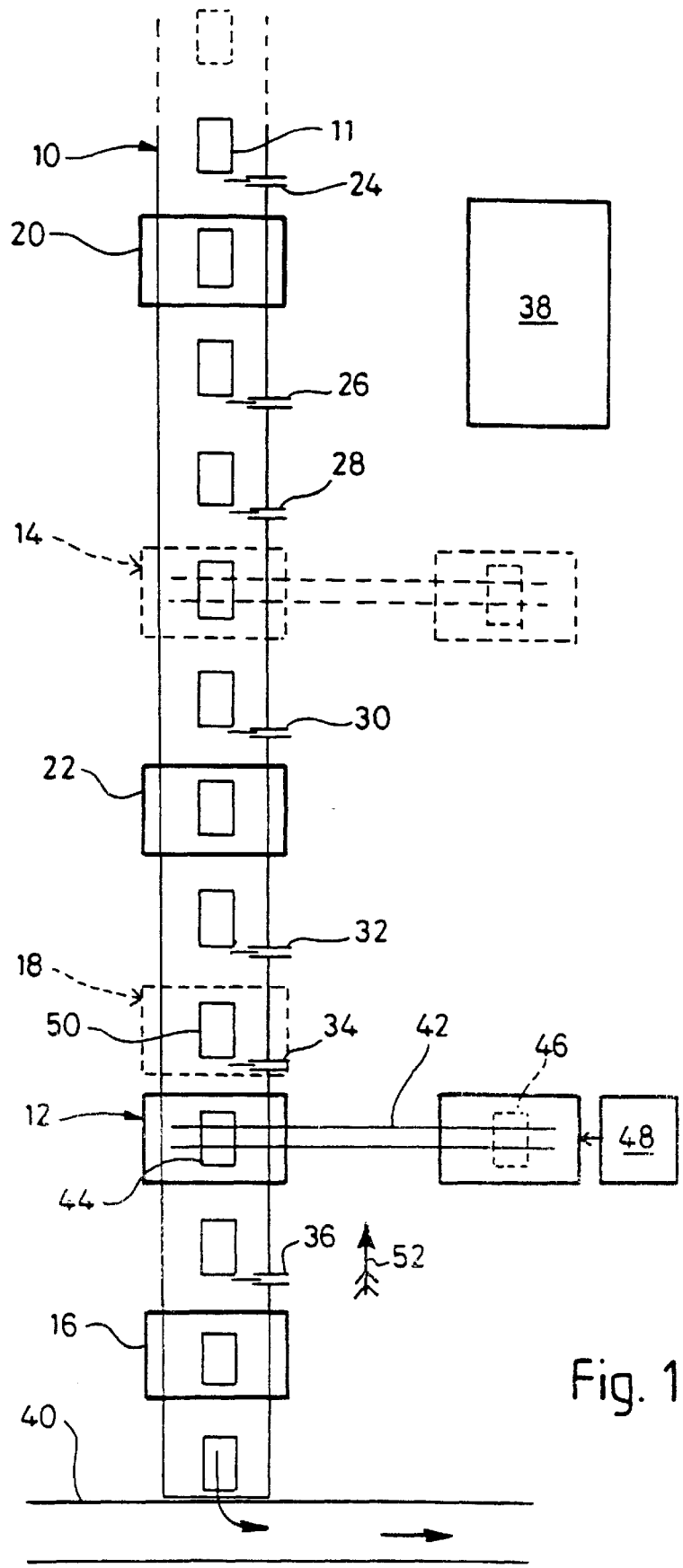

In FIG. 1 part of a machining line 10 is shown along which castings such as 11 proceed for machining operations to be performed thereon.

As a result of the machining, swarf and other fragments of metal can become lodged in internal cavities within the casting and it is an object of the present invention to provide for efficient removal of such material.

In general a single swarf removal station is sufficient and this is shown at 12. However additional swarf removal stages similar to that at 12 may be provided at intermediate positions along the line 10 and one such additional swarf removal stage is shown at 14.

In addition to swarf removal by vibration (to be described) at 12 (and if provided, 14), a fluid drench or wash is advantageously included at least after the vibratory swarf removal stage 12 as denoted by 16, and it may be advantageous to include an earlier drench or wash stage at 18 ahead of the vibratory swarf removal stage 12.

Machining stages are denoted at 20 and 22 and workpiece escapements denoted at 24, 26, 28, 30, 32, 34 and 36. The escapements are linked to a control system 38 to which information is supplied inter alia from sensors positioned along the line 10 so that the movement of the cylinder head castings along the line proceeds in a controlled manner. A buffer region is provided ahead of each swarf removing station 12, 14.

After swarf removal at 12 and a drench or wash at 16, the castings move off the line 10 onto a conveyor 40 for delivery to another line.

Each swarf removal stage such as 12 essentially comprises a gantry 42 which straddles the line 10 and includes a pick and place mechanism for lifting a casting from the line 10, from the position shown at 44, and rapidly transferring the casting to the offset position 46. At the offset position is a vibratory table controlled by an additional control system 48, also linked to the control system 38 for overall control. The control system 48 includes facilities for making fine adjustments to the vibration stage such as its frequency, amplitude and the duration of the vibration step.

After a casting has been vibrated, the pick and place mechanism operates to transfer the cleaned casting back to the position 44 where it is free to move off along the line 10. Operation of the escapements 32 and 34 enables the next casting in the line (denoted by reference numeral 50) to become located below the gantry 42, so that it can be transferred to position 46 by the pick and place mechanism in the manner previously described.

The total time permitted for the casting to be away from the line 10 is dictated by the overall speed of the line and typically a window of time of approximately 20 seconds is available on a machining line such as that used for machining cylinder head castings. In order to provide a margin of error, and to provide for transfer of castings into and out of the pick and place position below the gantry 42, an "away" time of approximately 17 seconds is available with 1.5 seconds at the beginning and end for the transfer of castings into and out of the station 12.

A casting needs to be vibrated for 5 seconds to achieve good swarf removal. Allowing 2 seconds for positioning the casting on the vibrating table and after vibration 2 seconds for relocating the pick and place mechanism to lift it clear of the table, allows 4 seconds for the journey time between 44 and 46 and a further 4 seconds for the return trip (from 46 to 44). In view of the relatively short distance involved, this has been found to be realisable in practice.

Although only single washing stations have been shown at 16 and 18, it is to be understood that either or both could be complex washing stations which include a plurality of jets for discharging fluid from above or below or both. The washing fluid may be liquid or gas or compressed air or combinations thereof.

Figure 2:
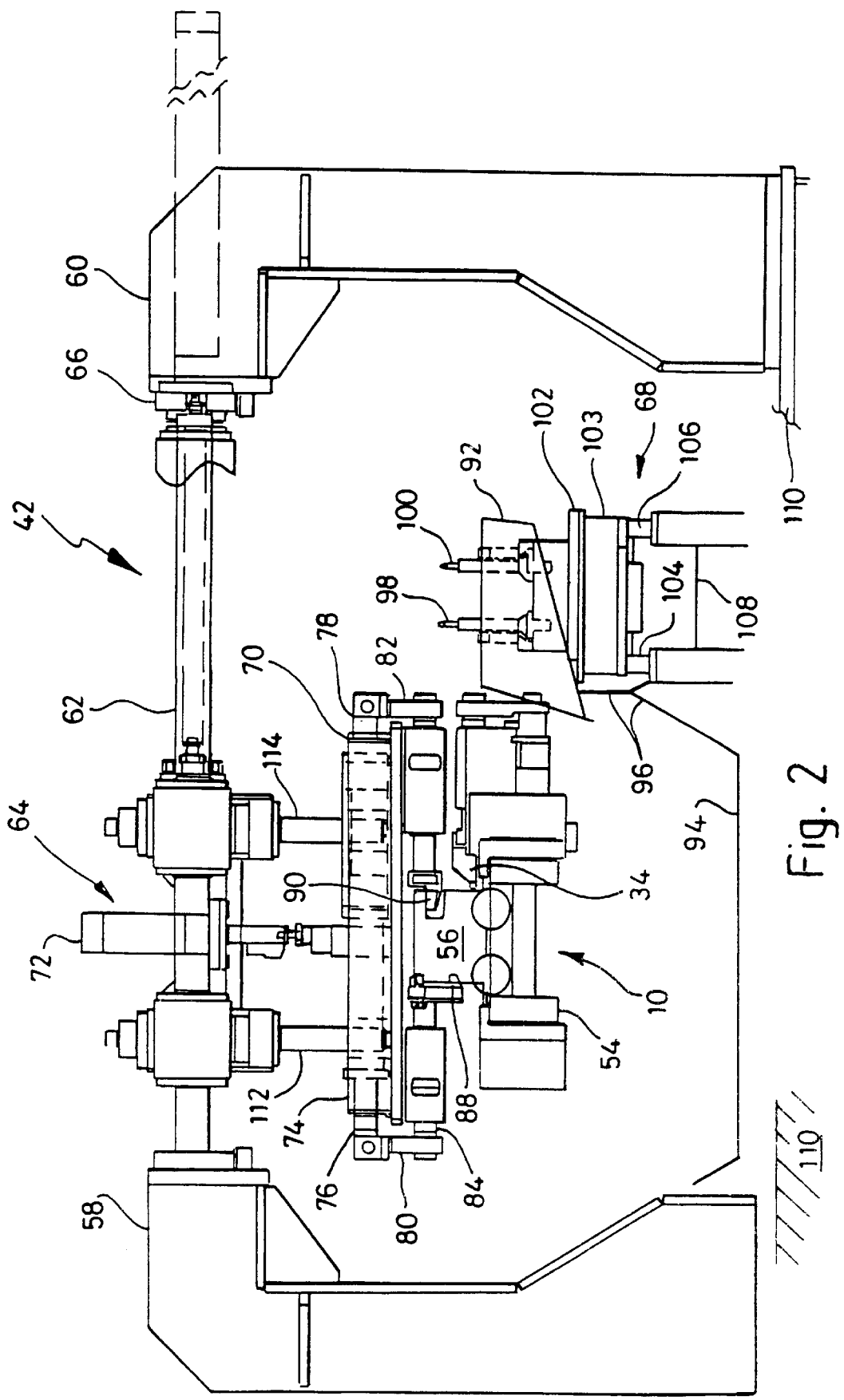

FIG. 2 illustrates in more detail the swarf removal station 12 as viewed in the direction of the arrow 52 in FIG. 1.

In FIG. 2 the conveyor 54 comprises the machining line 10 of FIG. 1 and an engine cylinder head casting is shown at 56. This occupies the position 44 in FIG. 1.

The gantry 42 which straddles the conveyor 54, includes lateral support members 58 and 60 and a slideway 62 along which a carriage assembly generally designated 64 can slide from the position shown in FIG. 2 to a position where the right hand end of the carriage assembly is up against the stop 66 at the right hand end of the slideway 60. In this position the carriage is centred above a vibratory unit generally designated 68.

An undercarriage 70 is suspended below the carriage assembly 64 and can be raised and lowered relative to the carriage assembly 64 by means of a pneumatic or hydraulic cylinder 72.

The undercarriage 70 includes a double-acting pneumatic or hydraulic cylinder generally designated 74 having symmetrically arranged opposed pistons and fluid inlets and outlets to permit the pistons to be moved outwardly and inwardly. As shown in FIG. 2, the pistons are in their innermost positions.

The two pistons are connected via rods 76 and 78 and connecting brackets 80 and 82 to a pair of slidable members 84 having at their inboard ends workpiece engaging fingers 88 and 90. With the pistons in their inboard position, the fingers 88 and 90 engage lateral recesses in the casting 56 so that if the undercarriage 70 is raised by the cylinder 72, the casting 56 will be lifted clear of the conveyor 54. Lateral movement of the carriage assembly 54 to the right hand position previously described conveys the casting to a position centred over the vibratory unit 68.

Once over the vibratory unit, the cylinder 72 can be operated so as to lower the undercarriage 70 to enable the casting to be located on the vibratory unit as will be hereinafter described.

Around the upper end of the vibratory unit is located a shedding plate 92 which collects swarf vibrated out of the castings. A trough 94 collects swarf which drops from the shedding plate 92. To this end the base of the shedding plate 92 is inclined towards the trough 94. The wall of the trough 94 is extended on the right hand side at 96 to close the gap between the trough and the lower end of the inclined base of the shedding plate 92.

To facilitate the location of the cylinder head castings on the vibratory unit, the latter includes four upstanding pins, two of which are visible in FIG. 2 at 98 and 100 respectively. The pins extends upwardly from a platform or table 102 and this is mounted by means of four vibration absorbing connectors, two of which are shown at 104 and 106, to a rigid foundation support 108.

The side supports 58 and 60 likewise extend from a stationary foundation support part of which is visible at 110 in FIG. 2.

In order to provide for the sliding movement of the undercarriage 70, the latter includes four equally spaced circular bushes which slide on four vertical pins, two of which can be seen at 112 and 114.

To the right of the conveyor 54 can be seen one of the escapements 32, 34, 36.

Figure 5:
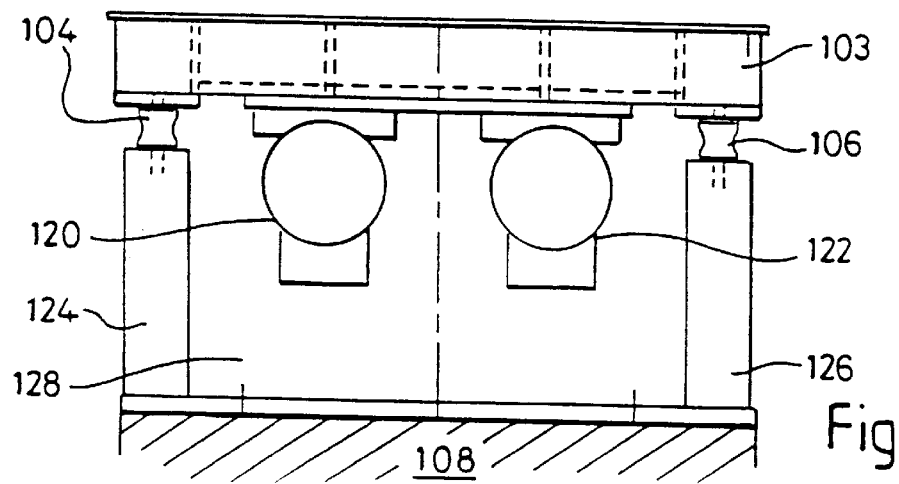

For more detail of the vibratory unit, see FIG. 5.

Figure 3:
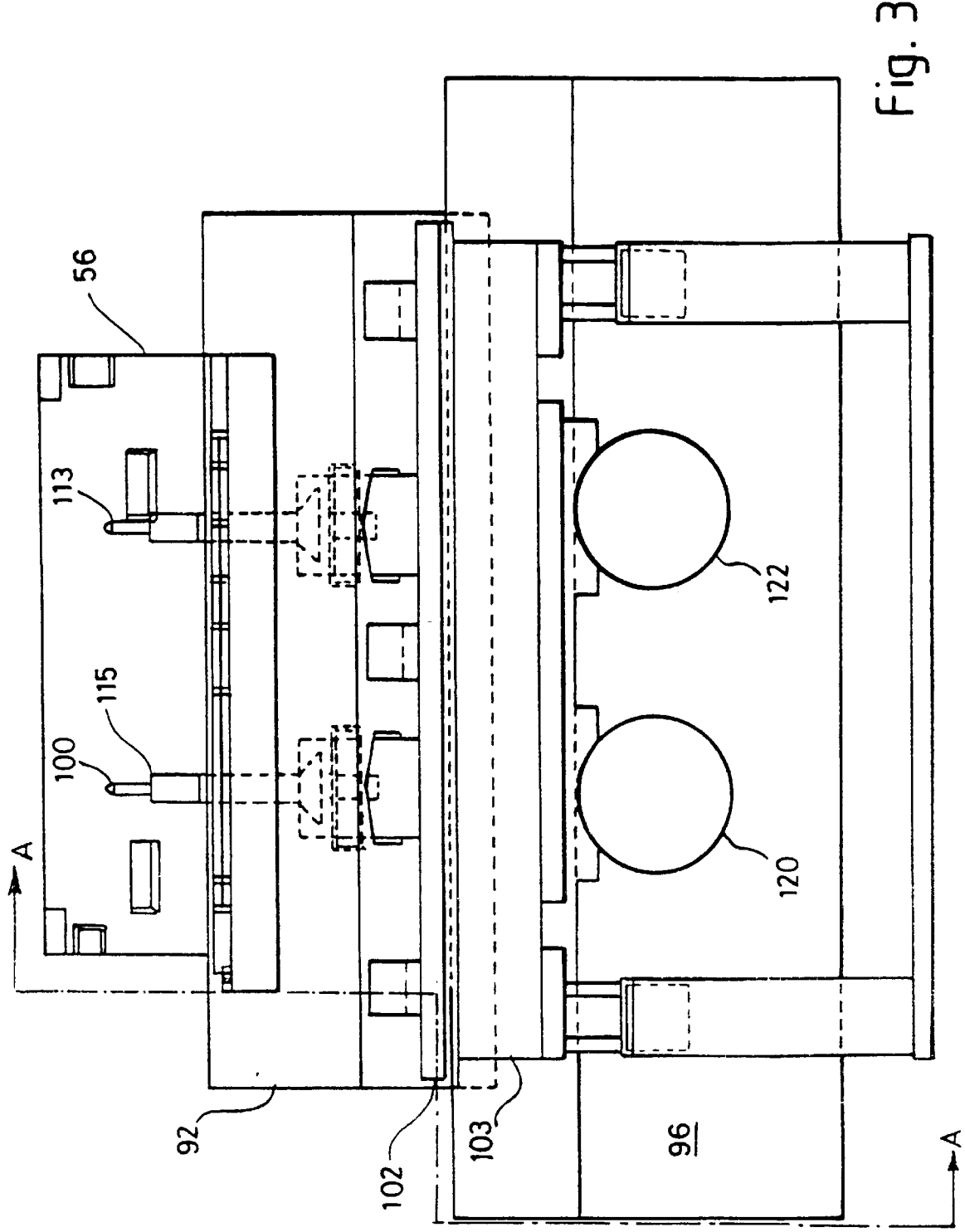
Figure 4:
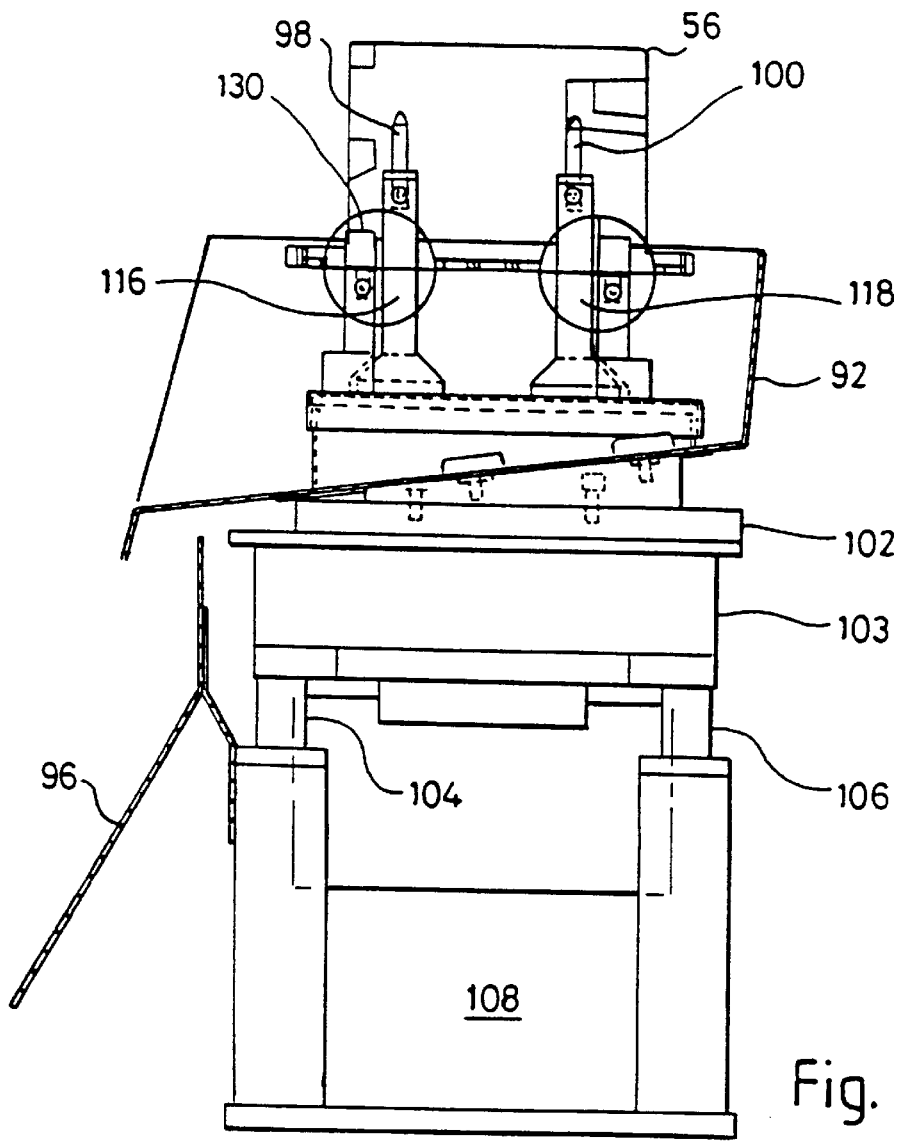

FIGS. 3 and 4 illustrate how the cylinder head casting 56 can be positioned on the pins 98, 100 etc. FIG. 3 shows one of the rear pair or pins 113 (which as viewed in FIG. 2 and in FIG. 4 lies behind and in line with pin 100). A similar pin (not visible) is aligned behind pin 98 (see FIG. 2) and behind pin 113 (in FIG. 3).

The casting includes a number of openings on its underside up through which the pins 98, 100 etc can protrude. A shoulder such as that shown in 115 in FIG. 3, is provided on each of the pins. The height of the shoulders is such that they just engage complementary shoulders (not shown) in the casting such that the latter after the casting has been impaled on the pins, rests squarely on the shoulders of the pins.

The pins 98, 100 etc are secured to the platform or table 102 so that if the latter is vibrated, this vibration is transmitted via the pins to the casting situated thereon.

The frequency and amplitude of vibration of table 102 determines the mode of vibration of the casting, and this is adjusted by means of the control system 48 so as to just cause the casting to bounce on the pins following each upward vibratory movement of the table. Since the pins extend upwardly into the casting beyond the shoulders such as 115, there is little tendency for the casting to migrate laterally relative to the pins. The casting therefore remains securely positioned on the pins albeit bouncing thereon at a frequency determined by the frequency of vibration of the table 102.

A preferred setting for the vibratory unit is one which causes the table to vibrate at a frequency of 50 Hz at an amplitude of a little over 1 mm. Accelerations of up to 5.78 g can be achieved using these parameters. A typical period for the actual vibration of the table is 5 seconds.

Allowing for pick up, transfer and placement, retrieval and return, a total cycle time for a casting 56 from the position shown in FIG. 2 back to the same position on the conveyor 54 is typically 17 seconds, as previously explained with reference to FIG. 1.

FIG. 4 shows in more detail the position of the shedding plate 92 and the extension plate 96 which conveys swarf into the trough 94 (not shown in FIG. 4).

It will be noted that the shedding plate 92 is carried by the table 102 which is vibrated so that swarf dropping onto the shedding plate 92 is also vibrated during each vibration step, causing it to migrate down the inclined surface towards the trough 94 (shown in FIG. 2).

The pins 98 and 100 extend from pillars 116 and 118 and are adjustable in height relative thereto (see FIG. 4). This adjustment enables the precise height of the top of the pins 98, 100 etc to be adjusted. In a similar manner although not shown, the lengths of the pillars such as 116, 118 can be adjusted so as to accommodate variation in height of the shoulders within the casting relative to the table 102.

Two rotary vibrating drives are mounted below the table 102 and are visible in FIG. 3. The two drives are identified by reference numerals 120 and 122. Preferred units are those supplied by Italvibras under Serial No. NVS13/200-S90. These units require 415 volts three phase 50 Hz supply and are mounted so as to contra-rotate.

FIG. 5 is a similar view to that of FIG. 3 of the lower part of the vibratory unit, and this shows how the platform 103 to which the table 102 is attached is mounted on vibration absorbing supports 104, 106 (with a further two such supports at opposite corners of the table and hidden from view in FIG. 5). In order to reduce its mass, the platform 103 is formed as a fabrication rather than a casting.

The four pillars of which two are shown at 124 and 126 and which form part of the fixture 108, extend from a baseplate 128 which is typically secured to a foundation which may comprise the factory floor. If further vibration isolation is required, an intermediate floor may be located at this point carried by further vibration absorbing means, to further reduce the transmission of vibration through to the factory floor.

As previously mentioned in relation to FIG. 1, an arrangement such as shown in FIGS. 2 to 5, may be located intermediate different machining steps along the line 10 and one such additional position is shown at 14 in FIG. 1.

The location of the cylinder head on the pins 98 and 100 etc requires very accurate positioning of the undercarriage 70. Less accurate positioning can be accommodated if the pins and pillars such as 98, 116 etc are retractable leaving an unrestricted platform 130 on which the casting can be positioned by the undercarriage 70. By approximately locating the casting in this way, upward movement of the pins 98 etc (after the lifting fingers 88 and 90 have been retracted from the casting and the undercarriage has been moved away), will cause the precise alignment required of the casting relative to the pins and as the latter rise so they will engage in the interior of the casting and lift the latter clear of the platform for vibration. To this end additional drive means is provided (not shown) involving further hydraulic or pneumatic cylinders within the vibratory unit for effecting the relative movement between the pins and the platform.

It is to be understood that if the pins are raised in this way, it may be appropriate to retract them before the casting is reengaged by the fingers 88, 90 etc.

I claim:

1. A method of removing swarf from a machined component comprising the steps of supporting the component on fingers forming part of a support means; vibrating at least the fingers of the latter in a manner to cause the component to be accelerated alternately at least partly in an upward direction and then at least partly downwardly for a given period of time thereby causing swarf to be removed; and thereafter removing the component from the support means to permit another component to take its place.

2. The method of claim 1, wherein the acceleration imparted to the component is such as to cause the component to momentarily lift off the fingers during at least part of each of the vibrations during the vibration period, so that the component is caused to bounce repetitively on the fingers.

3. The method of claim 1, wherein the fingers are vibrated at a frequency which is varied during each period of vibration so as to subject the component to a range of frequencies during the vibration period.

4. The method of claim 1, wherein the fingers are adapted to engage non-critical regions of the component so as to reduce potential damage to machined surfaces or distortion of the machined component during the vibration.

5. The method of claim 4, wherein the fingers extend upwardly and the method includes the step of locating the component thereon so that the fingers protrude up into cavities within the component, so as to reduce the risk of lateral displacement of the component relative to the fingers as it is vibrated.

6. The method of claim 4, wherein the fingers are movable relative to a support surface to engage the component and the method includes the step of positioning the component on the support surface and elevating the component therefrom by raising the fingers relative thereto.

7. The method of claim 1, wherein the component is inverted prior to being vibrated.

8. The method of claim 1, wherein to further assist in swarf removal, the component is vibrated successively, first upside down and then upright.

9. The method of claim 1, wherein the component is subjected to a fluid flush before or after the period of vibration or both before and after the period of vibration.

10. A method of machining a component comprising the steps of locating the component successively at a plurality of separate machining stages along a process line, and performing the swarf removal step of claim 1, after at least one, or some, or all, of the separate machining stages.

11. Vibratory apparatus for removing swarf from a machined component having an underside comprising a table with vibratory drive means associated therewith for imparting vibration thereto; fingers upstanding from the table to support the component at the underside thereof or in apertures in the underside; means for moving a machined component onto the fingers to support the latter thereon whilst the table is to be vibrated at least partly up and down; transfer means for moving the component from the fingers subsequent to vibration; and control means for controlling operation of the vibratory drive means.

12. Apparatus as claimed in claim 11, forming part of a process line along which components progress to be machined.

13. Apparatus as claimed in claim 12, which includes means to lift components from the process line sequentially so each in turn is clear of the line, for vibration for the given period of time, and then replaced on the line for onward transmission therealong.

14. Apparatus as claimed in claim 11, incorporated into and forming part of a component machining apparatus which itself forms part of a processing line along which the components traverse.

15. Apparatus according to claim 11, further comprising means for rotating the component into an inverted state.

16. Apparatus according to claim 11, wherein the table is set to vibrate a machined component at settings of frequencies in the range 40–80 $H_z$ with an amplitude of vibration in the rage 0.4–1.28 mm, thereby achieving accelerations in the range 3.5 to 6.4 g for periods of time in the range 5–20 seconds.

17. Apparatus according to claim 16, wherein the setting is 50 Hz for 5 seconds with an amplitude of 1.15 mm, achieving accelerations up to 5.78 g.

18. Apparatus according to claim 16, wherein the setting is 50 Hz for 5 seconds with an amplitude of 1.28 mm, achieving accelerations up to 6.4 g.

19. Apparatus according to claim 11, further comprising wash means upstream and/or downstream thereof.

20. Apparatus according to claim 19, wherein the wash means comprises means for jetting a liquid or gas or a mixture thereof towards the component.

21. Apparatus according to claim 11, further comprising high pressure wash jets arranged to flush a component prior to vibration.

22. Apparatus for removing swarf from a tappet chest region and from regions of drilled and tapped bolt holes of a machined engine cylinder head, comprising support means for supporting such a cylinder head in an inverted condition including fingers upstanding from the support means to support the cylinder head; and means for vibrating the support means to vibrate the cylinder head thereon, thereby to remove swarf from at least those regions thereof.

23. A method of removing swarf from a tappet chest region and from regions of drilled and tapped bolt holes of a machined engine cylinder head, comprising the steps of supporting the cylinder head in an inverted condition on fingers forming a part of a support means; and vibrating at least the fingers and thereby causing the cylinder head to vibrate relative thereto for a period of time, so that swarf is removed.

* * * * *